US011669290B2

(12) United States Patent
Saito

(10) Patent No.: US 11,669,290 B2
(45) Date of Patent: Jun. 6, 2023

(54) SERVER AND NON-TRANSITORY COMPUTER-READABLE RECORDING MEDIUM STORING COMPUTER-READABLE INSTRUCTIONS FOR SERVER

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/475,462

(22) Filed: Sep. 15, 2021

(65) Prior Publication Data

US 2022/0083300 A1 Mar. 17, 2022

(30) Foreign Application Priority Data

Sep. 16, 2020 (JP) .............................. JP2020-155754

(51) Int. Cl.
*G06F 3/12* (2006.01)
*H04N 1/00* (2006.01)

(52) U.S. Cl.
CPC .......... *G06F 3/1293* (2013.01); *G06F 3/1285* (2013.01); *H04N 1/00212* (2013.01); *H04N 1/00233* (2013.01)

(58) Field of Classification Search
None
See application file for complete search history.

(56) References Cited

U.S. PATENT DOCUMENTS

| 2008/0239371 A1* | 10/2008 | Sato | H04N 1/32117 |
| | | | 358/1.15 |
| 2008/0307059 A1* | 12/2008 | Ono | G06F 3/1238 |
| | | | 709/206 |
| 2012/0206765 A1* | 8/2012 | Nakajo | G06F 3/1239 |
| | | | 358/1.15 |
| 2014/0022592 A1 | 1/2014 | Ueda et al. | |
| 2018/0288071 A1* | 10/2018 | Ikeda | H04L 63/145 |

FOREIGN PATENT DOCUMENTS

| JP | 2000270151 | * | 9/2000 | ............. H04N 1/00 |
| JP | 2003067292 | * | 3/2003 | ............. G06F 13/00 |
| JP | 2007172015 | * | 7/2007 | ............. G06F 13/00 |
| JP | 2010282632 | * | 12/2010 | ............. G06F 13/00 |
| JP | 2012090219 | * | 5/2012 | ............. G06F 12/00 |
| JP | 2014-23019 A | | 2/2014 | |
| JP | 2016076058 | * | 5/2016 | ............. G06F 3/12 |

* cited by examiner

*Primary Examiner* — Beniyam Menberu
(74) *Attorney, Agent, or Firm* — Scully, Scott, Murphy & Presser, PC

(57) ABSTRACT

A server may receive a first e-mail including a first image file from a first external device and send a first print request to a first printer. After the first e-mail has been received from the first external device, the server may receive a second e-mail including a second image file from a second external device. The server may, in a case where the second e-mail is received from the second external device, determine whether the second e-mail was generated by using the first e-mail. The server may, in a case where it is determined that the second e-mail was not generated by using the first e-mail, send a second print request to the first printer. In a case where it is determined that the second e-mail was generated by using the first e-mail, the second print request may not be sent to the first printer.

15 Claims, 10 Drawing Sheets

SERVER AND NON-TRANSITORY COMPUTER-READABLE RECORDING MEDIUM STORING COMPUTER-READABLE INSTRUCTIONS FOR SERVER

CROSS-REFERENCE TO RELATED APPLICATION

This application claims priority to Japanese Patent Application No. 2020-155754, filed on Sep. 16, 2020, the entire contents of which are hereby incorporated by reference into the present application.

TECHNICAL FIELD

The disclosure herein discloses a technique related to a server that receives an e-mail from an external device and sends a print request to a printer.

BACKGROUND ART

A network system including an image-forming device and a terminal device is known. When the image-forming device receives an e-mail, it extracts one or more e-mail addresses designated as the recipient(s) of the e-mail. The image-forming device executes a print process based on the e-mail in a case where one e-mail address is extracted, while it does not execute the print process based on the e-mail in a case where plural e-mail addresses are extracted.

SUMMARY

According to the above technique, the print process is not executed even if a user desires the print process to be executed based on the e-mail that includes plural e-mail addresses as recipient e-mail addresses. The disclosure herein provides a technique that enables a server to appropriately switch whether to cause a printer to execute printing or not when it receives an e-mail including a plurality of e-mail addresses as recipient e-mail addresses.

A server disclosed herein may comprise: a memory configured to store, for each of one or more e-mail addresses, the e-mail address and printer identification information for identifying a printer in association with each other; and a controller. The controller may be configured to: receive a first e-mail including a first image file from a first external device, the first e-mail including, as recipient e-mail addresses, a first print address that is an e-mail address stored in the memory and a first general address that is an e-mail address that is not stored in the memory; in a case where the first e-mail is received from the first external device, send a first print request to a first printer, the first print request being a signal for requesting a first image corresponding to the first image file included in the first e-mail to be printed, and the first printer being a printer identified by first printer identification information stored in the memory in association with the first print address, after the first e-mail has been received from the first external device, receive a second e-mail including a second image file from a second external device, the second e-mail including, as recipient e-mail addresses, the first print address and a second general address that is an e-mail address that is not stored in the memory; in a case where the second e-mail is received from the second external device, determine whether the second e-mail was generated by using the first e-mail; and in a case where it is determined that the second e-mail was not generated by using the first e-mail, send a second print request to the first printer, the second print request being a signal for requesting a second image corresponding to the second image file included in the second e-mail to be printed, wherein in a case where it is determined that the second e-mail was generated by using the first e-mail, the second print request is not sent to the first printer.

A control method, a computer program, and a computer-readable recording medium storing the computer program for implementing the above server are also novel and useful. A communication system comprising the above server and another device (such as the first printer) is also novel and useful.

EMBODIMENTS

Figure 1:
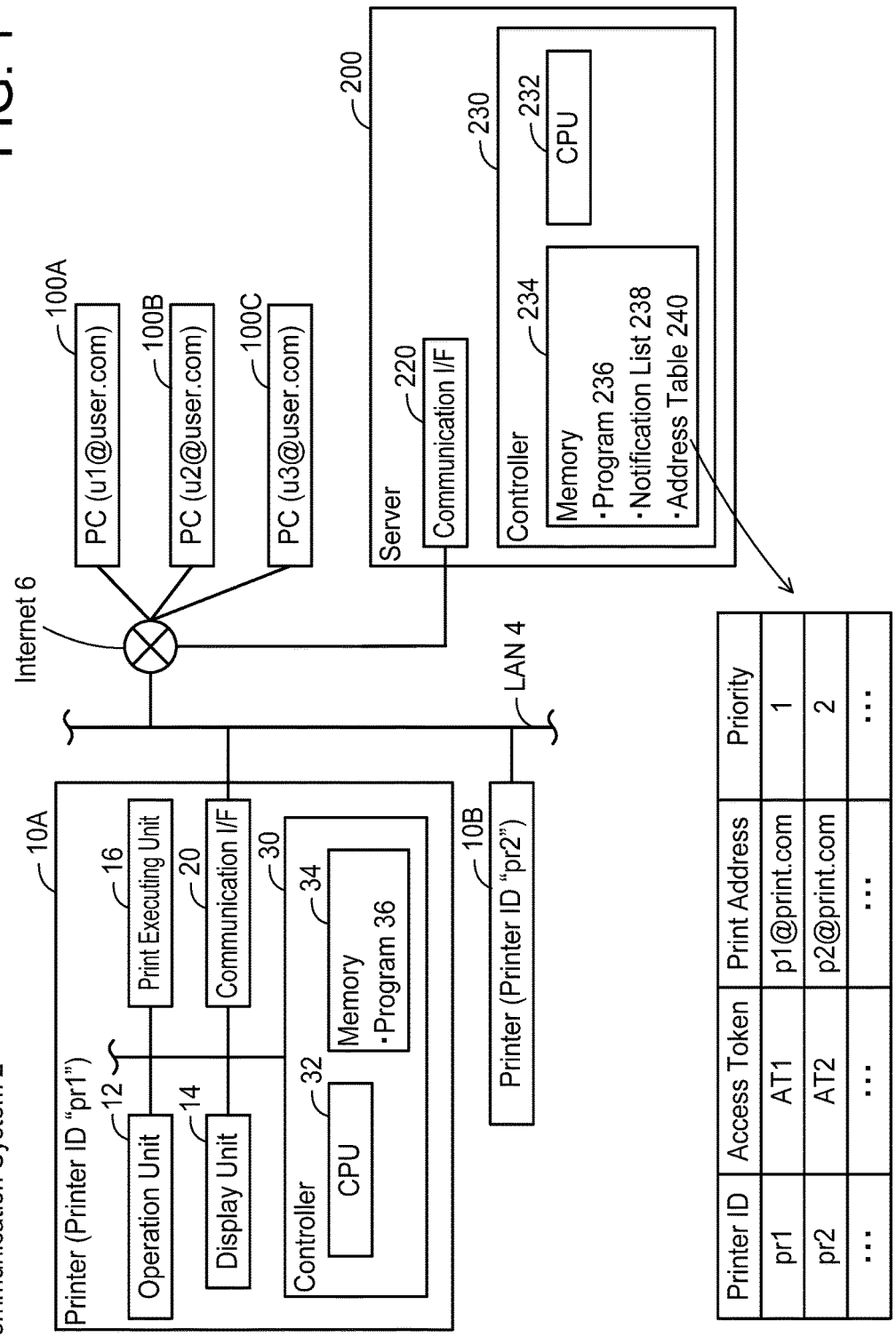
FIG. 1 shows a configuration of a communication system.

First Embodiment (Configuration of Communication System 2: FIG. 1)
As shown in FIG. 1, a communication system 2 includes a plurality of printers 10A and 10B, a plurality of PCs 100A to 100C, and a server 200. The printers 10A and 10B are connected to a LAN (local area network) 4. The LAN 4 is connected to the Internet 6. The PCs 100A to 100C and the server 200 are connected to the Internet 6. The printers 10A and 10B, the PCs 100A to 100C, and the server 200 are communicable via the Internet 6.

(Configurations of Printers 10A and 10B)
The printer 10A is a peripheral device (i.e., a peripheral device of the PC 100A, etc.) configured to execute a print function. The printer 10A may be a multi-function device that is capable of executing a scan function, a FAX function, and/or the like in addition to the print function. The printer 10A is further capable of executing an e-mail print function. The e-mail print function is a function for printing an image corresponding to an image file included in an e-mail. In a variant, the e-mail print function may be a function for printing an image corresponding to an image file inserted in the hod) of an e-mail. The printer 10A includes an operation unit 12, a display unit 14, a print executing unit 16, a communication interface (hereinafter, "interface" will be abbreviated as "I/F") 20, and a controller 30. The printer 10A is assigned with a printer ID "pr1", which is illumination for identifying the printer 10A.

The operation unit 12 includes a plurality of keys. A user can input various instructions to the printer 10A by operating the operation unit 12. The display unit 14 is a display configured to display various types of information. The display unit 14 also serves as a so-called touch screen (i.e., an operation unit). The print executing unit 16 is a print mechanism of ink jet scheme, laser scheme, or the like. The communication I/F 20 is connected to the LAN 4. The communication I/F 20 may be a wireless I/F or a wired I/F.

The controller 30 includes a CPU 32 and a memory 34. The CPU 32 is configured to execute various processes in accordance with a program 36 stored in the memory 34. The memory 34 is configured of a volatile memory, a non-volatile memory, and the like. The printer 10B is the same as the printer 10A except that it is assigned with a printer ID "pr2".

(Configurations of PCs 100A to 100C)

The PCs 100A to 100C are used by users who can use the printer 10A. The PC 100A is used by a user who uses an e-mail address "u1@user.com". The PC 100B is used by a user who uses an e-mail address "u2@user.com". The PC 100C is used by a user who uses an e-mail address "u3@user.com". The PCs 100A, 100B, and 100C are configured to receive an e-mail including the e-mail address "u1@user.com" as a recipient email address, an e-mail including the e-mail address "u2@user.com" as a recipient e-mail address, and an e-mail including the e-mail address "u3@user.com" as a recipient e-mail address, respectively.

(Configuration of Server 200)

The server 200 is installed on the Internet 6 by a vendor of the printers 10A and 10B. In a variant, the server 200 may be installed on the Internet 6 by a different emits from the vendor. The server 200 executes communication for causing the printers 10A and 10B to execute the e-mail print function. The server 200 is configured to receive an e-mail that includes an e-mail address with a domain name "print.com" of the server 200 as a recipient e-mail address.

The server 200 includes a communication I/F 220 and a controller 230. The communication I/F 220 is connected to the Internet 6. The controller 230 includes a CPU 232 and a memory 234. The CPU 232 is configured to execute various processes in accordance with a program 236 stored in the memory 234. In addition to the program 236, the memory 234 further stores a notification list 238 and an address table 240.

The notification list 238 stores one or more e-mail addresses corresponding to user(s) who is(are) permitted to use the e-mail print function. E-mail addresses are registered in the notification list 238 by users of the printers 10A and 10B or by an administrator of the printers 10A and 10B. In a variant, e-mail addresses may be registered in the notification list 238 by an administrator of the server 200, hereinbelow, e-mail addresses in the notification list 238 may be referred to as "notification addresses".

In the address table 240, a printer ID, an access token, a print address, and a priority are stored in association with each other. Each access token is authentication information for establishing an XMPP (Extensible Messaging and Presence Protocol) session with a corresponding printer. Each print address is an e-mail address for identifying a printer that is to execute the e-mail print function. The print address is generated by the server 200. Each priority is information that is used, when two or more printers are designated as printers that are to execute the e-mail print function, to determine which of the printers should execute the e-mail print function. In the present embodiment, the priorities are set by the users of the printers 10A and 10B or by the administrator of the printer 10A and 10B. In a variant, the priorities in the address table 240 may be set by the administrator of the server 200. In a variant, the priorities may be set in descending order of the number of times the printers have been designated as a printer that is to execute the e-mail print function. In another variant, the server 200 may be configured to periodically receive pieces of information indicating states of respective printers (such as "waiting", "error", "printing in progress", etc.). and the priorities may be set according to the states of the printers. For example, the priority of a printer indicating "waiting" is set to the highest.

Figure 2:
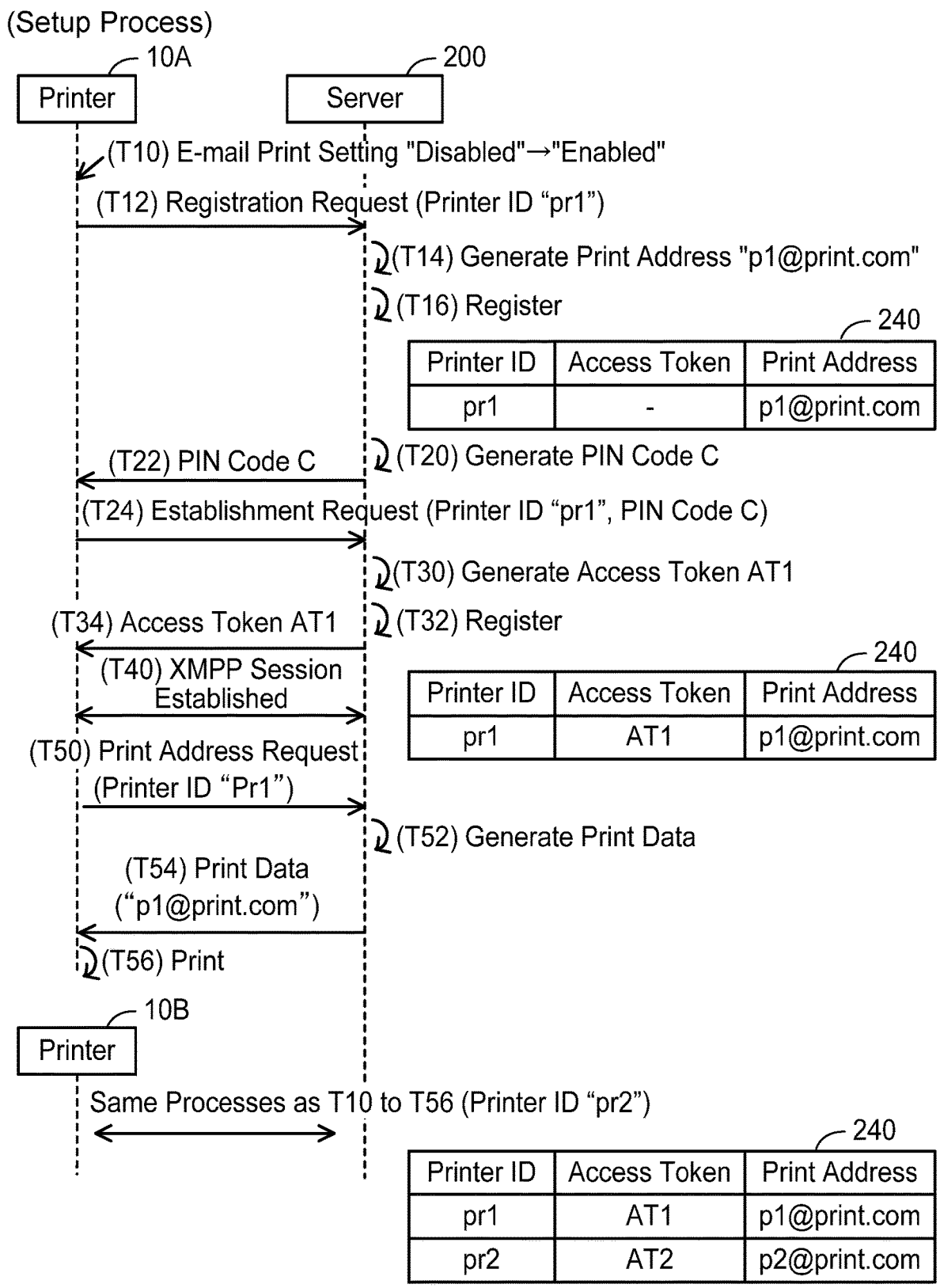
FIG. 2 shows a sequence diagram of a setup process.

(Setup Process: FIG. 2)

Referring to FIG. 2, a setup process will be described. In the setup process, information used in communication for executing the e-mail print function is registered in the server 200 and XMPP sessions are established between each of the printers 10A and 10B and the server 200. Hereinbelow, for the sake of easier understanding, processes executed by the CPUs of respective devices (e.g., the CPU 232 of the server 200) may be described with the devices the server 200) as the subjects of action, instead of describing the CPUs as the subjects of action. In the following description, communication between the printers 10A and 10B and the server 200 is executed via the LAN 4 and the Internet 6, and communication between the PCs 100A to 100C and the server 200 is executed via the Internet 6. Thus, phrases "via the LAN 4" and "via the Internet 6" will be omitted hereinbelow, unless otherwise stated.

When the printer 10A accepts, from the administrator of the printer 10A, an operation for changing an e-mail print setting of the printer 10A from "Disabled" to "Enabled" in T10, the printer 10A changes the e-mail print setting from "Disabled" to "Enabled". The e-mail print setting indicates whether to permit the e-mail print function to be executed or not. "Disabled" indicates that the e-mail print function is prohibited from being executed, while "Enabled" indicates that the e-mail print function is permitted to be executed. The e-mail print setting indicates "Disabled" by default. Then, in T12, the printer 10A sends the server 200 a registration request that requests the registration of information used in communication for executing the e-mail print function. The registration request includes the printer ID "pr1".

When receiving the registration request from the printer 10A in T12, the server 200 generates a print address "p1@print.com" in T14. The print address "p1@print.com" includes a local portion "p1" and the domain name "print.com" of the server 200. Then, in T16, the server 200 registers the printer ID "pr1" and the print address "p1@print.com" in association with each other in the address table 240. The server 200 then generates a PIN code C in 120. The server 200 stores the printer ID "pr1" and the PIN code C in association with each other temporarily in the memory 234. The server 200 then sends the PIN code C to the printer 10A in T22.

When receiving the PIN code C from the server 200 in T22, the printer 10A sends the server 200 an establishment request that requests the establishment of an XMPP session in T24. The establishment request includes the printer ID "pr1" and the PIN code C.

When receiving the establishment request from the printer IDA in T24, the server 200 executes authentication for the PIN code C included in the establishment request. The server 200 determines that the authentication is successful because the printer ID "pr1" and the PIN code C in the establishment request coincide with the printer "pr1" and the PIN code C in the memory 234 of the server 200. Then, the server 200 generates an access token AT1 in T30 and registers the access token AT1 in association with the printer ID "pr1" in the address table 240 in 132. The server 200 then sends the access token AT1 to the printer 10A in T34.

When receiving the access token AT1 from the server 200 in 134, the printer 10A establishes an XMPP session with the server 200 in 140 by using the access token AT1. By using the XMPP session, the server 200 can send requests to the printer beyond the firewall of the LAN 4 to which the printer belongs (e.g., a firewall formed by a router) without receiving requests from the printer. The method for sending requests from the server 200 to the printer is not limited to the XMPP session, and another method may be used. For example, a session according to HTTPS (Hypertext Transfer Protocol Secure) may be established between the printer and the server 200. In T50, the printer 10A sends a print address request including the printer ID "pr1" to the server 200. The print address request is a signal that requests the print address corresponding to the printer ID in the print address request to be sent.

When receiving the print address request from the printer 10A in 150, the server 200 specifies the print address "p1@print.com" associated with the printer ID "pr1" included in the print address request from the address table 240, and generates print data including the print address "p1@print.com" as a character string in 152. Then, in 154, the server 200 sends the print data including the print address "p1@print.com" as a character string to the printer 10A.

When receiving the print data from the server 200 in 154, the printer 10A prints an image corresponding to the print data in T56. Thus, the print address "p1@print.com" is printed on paper. After this, the administrator of the printer 10A notifies user(s) who is(are) permitted to use the e-mail print function using the printer 10A of the print address "p1@print.com". As a result, the e-mail print function can be executed using the printer 10A. In the following, description, the access token AT1 is used in communication between the printer 10A and the server 200, however, a mention of "the access token AT1" is omitted.

When processes similar to the processes of T10 to T56 have been executed between the printer 10B and the server 200, the e-mail print function can be executed using the printer 10B. In the process of T12 between the printer 10B and the server 200, a registration request including the printer ID "pr2" is communicated. The server 200 generates a print address "p2@print.com" corresponding to the printer 10B in T14, and registers the printer ID "pr2" and the print address "p2@print.com" in association with each other in the address table 240 in 116. The server 200 generates an access token AT2 in 130, and registers the access token AT2 in association with the printer ID "pr2" in the address table 240 in 132. The server 200 generates print data that includes the print address "p2@print.com" as a character string in 152, and sends the print data including the print address "p2@print.com" as a character string to the printer 10B in T54. In T56, the printer 10B prints an image corresponding to the print data including the print address "p2@print.com" as a character string. Then, the administrator of the printer 10B notifies user(s) who is(are) permitted to use the e-mail print function using the printer 10B of the print address "p2@print.com". As a result, the e-mail print function can be executed using the printer 10B. In the following description, the access token AT2 is used in communication between the printer 10B and the server 200, however, a mention of "the access token AT2" will be omitted.

Figure 3:
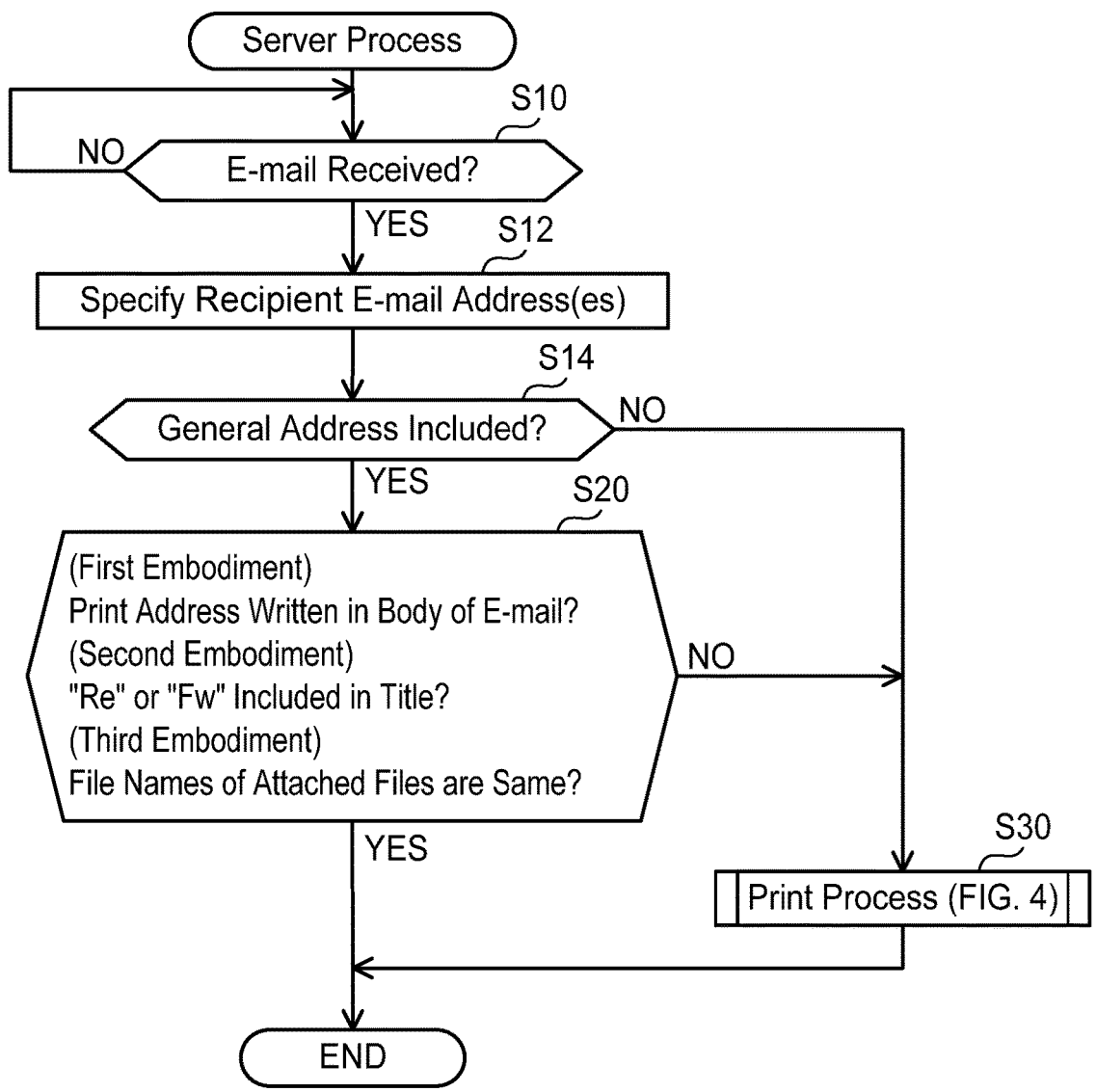
FIG. 3 shows a flowchart of a server process.

(Server Process; FIG. 3)

Next, referring to FIG. 3, a server process executed by the CPU 232 of the server 200 will be described. When the server 200 is turned on, the process of FIG. 3 is started.

In S10, the CPU 232 monitors whether an e-mail to which an image file is attached is received from a PC. In a case where such an e-mail is received from a PC, the CPU 232 determines YES in S10 and proceeds to S12.

In S12, the CPU 232 specifies one or more recipient e-mail addresses included in the e-mail received in S10 (which may be referred to as "the received e-mail" hereinafter). A recipient e-mail address is an e-mail address placed in a recipient e-mail address section (e.g., 304 in FIG. 5) which is the section indicative of "To" in the e-mail. In a variant, an e-mail address placed in the section indicative of "CC" in the e-mail may also be considered as a recipient e-mail address.

In S14, the CPU 232 determines whether the one or more recipient e-mail addresses specified in S12 (which may be referred to as "the specified recipient e-mail address(es)" hereinbelow) include a general address or not. A general address is an e-mail address that does not include the domain name "print.com" of the server 200 and is assigned to a user, not to a printer. In a case where the one or more specified recipient e-mail addresses include a general address (YES in S14), the CPU 232 proceeds to S20. In a case where the one or more specified recipient e-mail addresses do not include a general address (NO in S14), the CPU 232 proceeds to S30.

In S20, the CPU 232 determines whether the received e-mail was generated by using an e-mail the server 200 had previously received. In the present embodiment, the CPU 232 determines whether a print address is written in a body section (e.g., 310 in FIG. 5) which is the section indicative"text" of the received e-mail. In a case where a print address is written in the body section (YES in S20), the CPU 232 ends the process of FIG. 3. On the other hand, in a case where no print addresses are written in the body section (NO in S20), the CPU 232 proceeds to S30.

In S30, the CPU 232 executes a print process. The print process is a process for causing a printer to execute the e-mail print function. When S30 is completed, the CPU 232 ends the process of FIG. 3.

Figure 4:
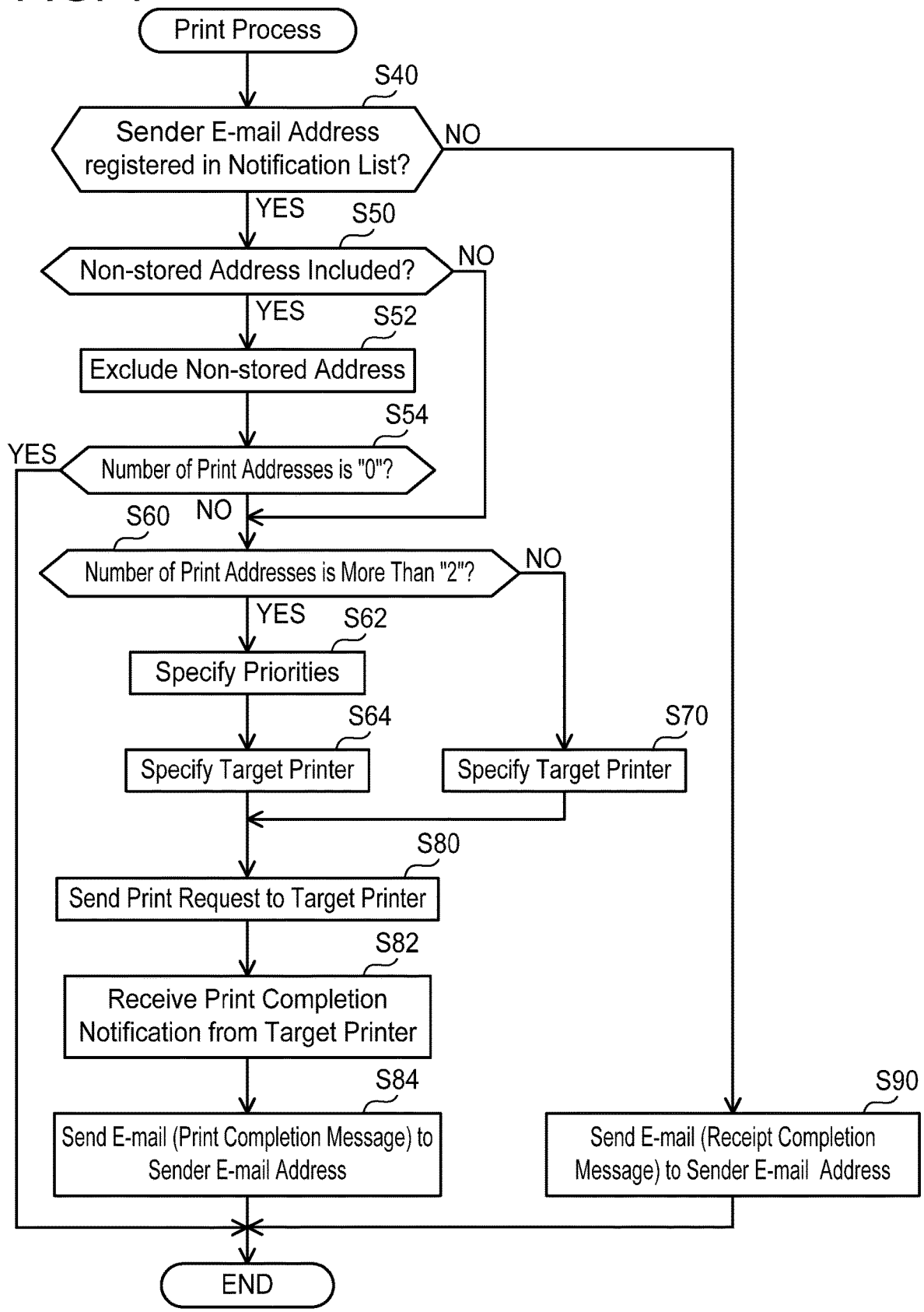
FIG. 4 shows a flowchart of a print process.

(Print Process: FIG. 4)

Next, the print process executed in S30 of FIG. 3 will be described. In S41, the CPU 232 determines whether the e-mail address in the sender e-mail address section of the received e-mail (which may be referred to as "the sender e-mail address") is registered in the notification list 238. In a case where the sender e-mail address is in the notification list 238 (YES in S40), the CPU 232 proceeds to S50. On the other hand, in a case where the sender e-mail address is not in the notification list 238 (NO in S40), the CPU 232 proceeds to S90.

In S90, the CPU 232 generates an e-mail that includes the sender e-mail address of the received e-mail as a recipient e-mail address and sends it. This e-mail includes a receipt completion message indicating that the server 200 has received the e-mail. The user is thereby able to know that the e-mail has been received. The CPU 232 ends the process of FIG. 4 when the process of S90 is completed.

In S50, the CPU 232 determines whether the one or more specified recipient e-mail addresses include a non-stored address. A non-stored address is an e-mail address that includes the domain name "print.com" of the server 200 but is not registered in the address table 240. For example, an e-mail address that was entered incorrectly by a user is a non-stored address. In a case where the one or more specified recipient e-mail addresses include a non-stored address (YES in S50), the CPU 232 proceeds to S52. On the other hand, in a case where the one or more specified recipient e-mail addresses do not include a non-stored address (NO in S50), the CPU 232 skips S52 and S54 and proceeds to S60.

In S52, the CPU 232 excludes the non-stored address from the one or more specified recipient e-mail addresses.

In S54, the CPU 232 determines whether the one or more specified recipient e-mail addresses include no print address. In a case where no print address is included in the one or more specified recipient e-mail addresses (YES in S54), the CPU 232 ends the process of FIG. 4. On the other hand, in a case where one or more print addresses are included in the one or more specified recipient e-mail addresses (NO in S54), the CPU 232 proceeds to S60. Determining YES in S50 and YES in S54 means that all e-mail addresses included in the one or more specified recipient e-mail addresses are non-stored addresses.

In S60, the CPU 232 determines whether two or more print addresses are included in the one or more specified recipient e-mail addresses. In a case where two or more print addresses are included in the specified recipient e-mail addresses (YES in S60), the CPU 232 proceeds to S62. On the other hand, in a case where only one print address is included in the one or more sped lied recipient e-mail addresses (NO in S60), the CPU 232 proceeds to S70.

In S62, the CPU 232 specifies, in the address table 240, priorities respectively associated with the two or more print addresses included in the specified recipient e-mail addresses.

In S64, the CPU 232 specifies a target printer using the priorities specified in S64. The target printer is a printer that is caused to execute the e-mail print function. The CPU 232 specifies the printer ID corresponding to the highest-priority print address in the address table 240 and specifies the printer corresponding to that printer ID as the target printer.

In S70, the CPU 232 specifies the printer ID corresponding to the one print address included in the one or more specified recipient e-mail addresses in the address table 240, and specifies the printer corresponding to that printer ID as the target printer.

In S80, the CPU 232 generates print data by converting the image file attached with the received e-mail and sends a print request to the target printer. After that, when the CPU 232 receives a print data request from the target printer, the CPU 232 sends the generated print data to the target printer.

In S82, the CPU 232 receives a print completion notification from the target printer. The print completion notification indicates that an image corresponding to the print data sent to the target printer has been printed.

In S84, the CPU 232 generates an e-mail that includes the sender e-mail address as a recipient e-mail address and sends it. This e-mail includes a print completion message indicating that the image has been printed. The user is thereby able to know that the e-mail print function has been executed. The notification from the target printer in S82 may be an error notification indicating that printing of the image has failed. In this case, the CPU 232 sends in S84 an e-mail that includes an error message indicating that the printing of the image has failed. When S84 is completed, the CPU 232 ends the process of FIG. 4. In a variant, the processes of S82 and S84 can be omitted.

(Specific Cases; FIGS. 5 to 9)

Next, referring to FIGS. 5 to 9, specific cases realized by the processes of FIGS. 3 and 4 will be described.

Figure 5:
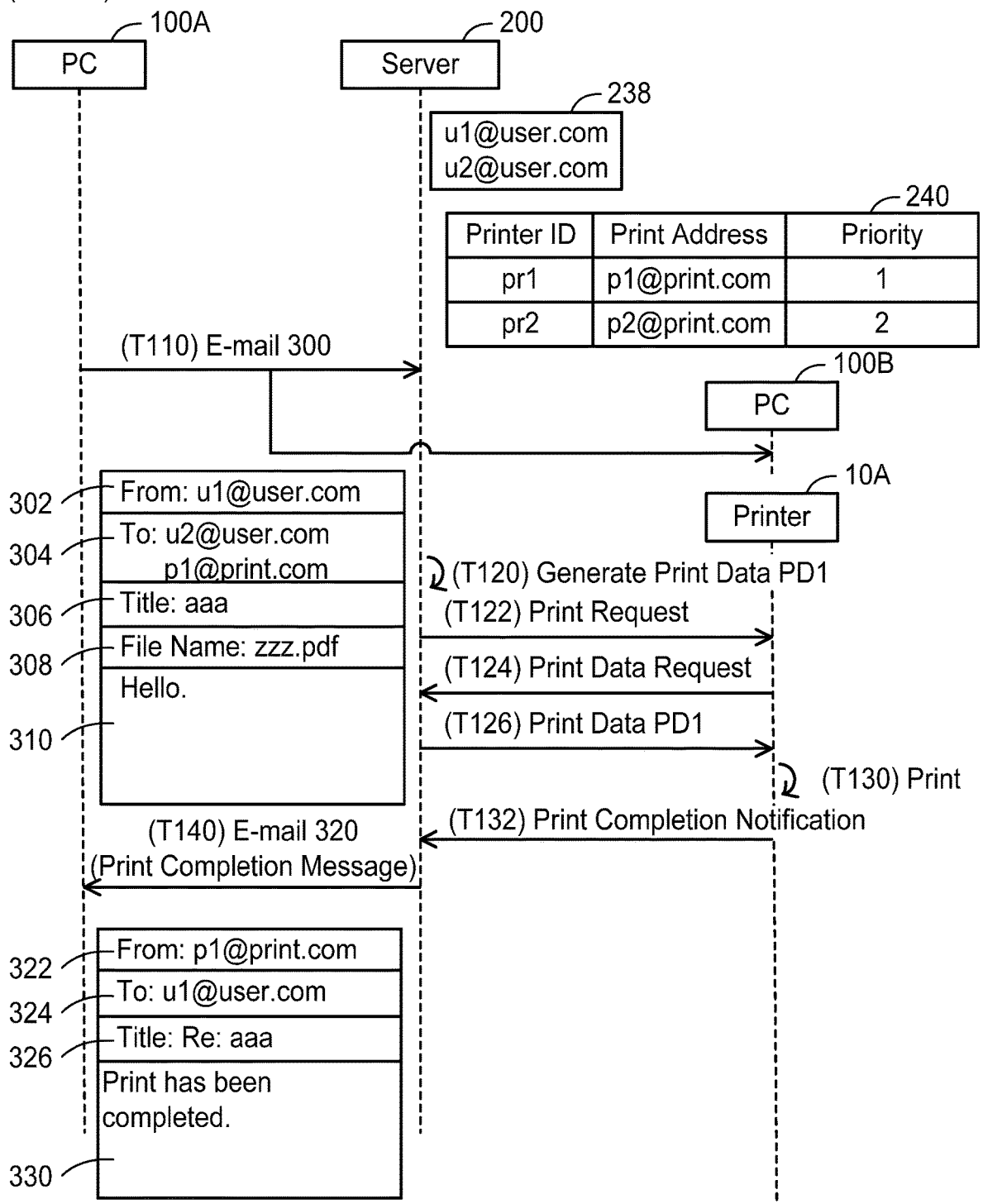
FIG. 5 shows a sequence diagram for Case A in which an c-mail including one print address as a recipient e-mail address is sent.

(Case A; FIG. 5)

Referring to FIG. 5, Case A will be described. In Case A, an e-mail 300 that includes one print address as a recipient e-mail address is sent. An initial state of Case A is the state after the setup process of FIG. 2 has been completed. That is, the printer ID "pr1", the access token AT1, and the print address "p1@printer.com" are already stored in association with each other in the address table 240 of the server 200. Further, the printer ID "pr2", the access token AT2, and the print address "p2@printer.com" are already stored in association with each other in the address table 240. In addition, in the address table 240, a priority "1" is associated with the printer ID "pr1", and a priority "2" is associated with the printer ID "pr2". Further, the e-mail addresses "u1@user.com" and "u2@user.com" are already registered in the notification list 238.

The PC100A generates the e-mail 300 when receiving an operation for generating an e-mail, an operation for adding the e-mail addresses "u2@user.com" and "p1@print.com" in the recipient e-mail address section, an operation for writing, a character string "aaa" in the title section, an operation for writing a character string "Hello" in the body section, and an operation for attaching an image file having a file name "zzz.pdf". In the e-mail 300, the sender e-mail address "u1@user.com" is in a sender e-mail address section 302, the recipient e-mail addresses "u2@user.com" and "p1@print.com" are in a recipient e-mail address section 304, the title "aaa" is in a title section 306, the file name "zzz.pdf" is in a file name section 308, and the text "Hello" is in a body section 310. When receiving an operation for sending the e-mail 300, the PC 100A sends the e-mail 300 in T110. The e-mail 300 is sent to the PC 100B and the server 200 since it includes the e-mail addresses "u2@user.com" and "p1@print.com" as the recipient e-mail addresses.

When receiving the e-mail 300 from the PC 100A in T110 (YES in S10 of FIG. 3), the server 200 specifies the recipient e-mail addresses "u2@user.com" and "p1@print.com" of the e-mail 300 (S12). Then, the server 200 determines that the specified recipient e-mail addresses include the general address "u2@user.com" (YES in S14) and determines that no print addresses are written in the body section 310 (NO in S20). The server 200 then determines that the sender e-mail address "u1@user.com" of the e-mail 300 is registered in the notification list 238 (YES in S40), determines that the specified recipient e-mail addresses do not include a non-stored address (NO in S50), and determines that the specified recipient e-mail addresses include one print address "p1@print.com" (NO in S60). Then, the server 200 specifies the printer ID "pr1" corresponding to the print address "p1@print.com" in the address table 240 and specifies the printer 10A corresponding to the printer ID "pr1" as a target printer (S70). Then, in T120, the server 200 generates print data PD1 by converting the image file "zzz.pdf" attached with the e-mail 300. The server 200 then sends a print request to the printer 10A in T122 (S80), receives a print data request from the printer 10A in T124, and sends the print data PD1 to the printer 10A in T126.

When receiving the print data PD1 from the server 200 in T126, the printer 10A prints an image corresponding to the print data PD1 in T130. That is, the e-mail print function is executed. The printer 10A then sends a print completion notification to the server 200 in T132.

When receiving the print completion notification from the printer 10A in T132 (S82), the server 200 generates an e-mail 320 and sends the e-mail 320 in T140 (S84). In the e-mail 320, the sender e-mail address "p1@print.com" is in a sender e-mail address section 322, the recipient e-mail address "u1@user.com" is in a recipient e-mail address section 324, a title "Re: aaa" is in a title section 326, and a print completion message (a character string "Printing has been completed") is in a body section 330. The e-mail 320 is sent to the PC 100A since it includes the e-mail address "u1@user.com" as the recipient e-mail address. By opening the e-mail 320, the user of the PC 100A is able to know that the e-mail print function has been executed.

Figure 6:
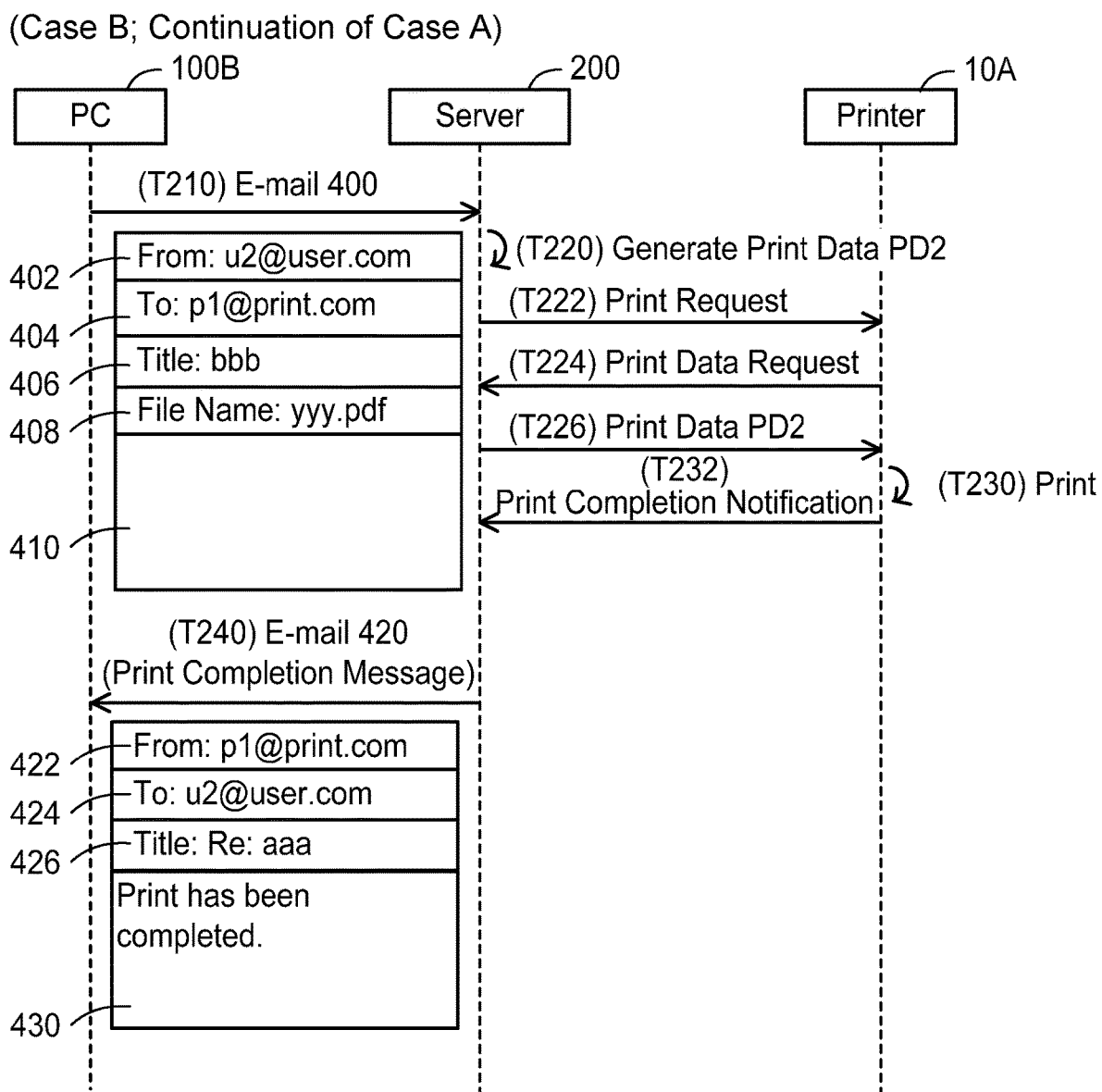
FIG. 6 shows a sequence diagram for Case B in which an e-mail print function is executed after Case A.

(Case B; FIG. 6)

Next, referring to FIG. 6, Case B will be described. In Case B, the e-mail print function is executed after the e-mail 300 has been sent from the PC 100A. Case B takes place after Case A. That is, the PC 100B has already received the e-mail 300.

The PC 100B generates an e-mail 400 when receiving an operation for generating an e-mail, an operation for adding the e-mail address "p1@print.com" to a recipient e-mail address section, an operation for writing a character string "bbb" in a title section, and an operation for attaching an image file having a file name "yyy.pdf". In the e-mail 400, the sender e-mail address "u2@user.com" is in a sender e-mail address section 402, the recipient e-mail address "p1@print.com" is in a recipient e-mail address section 404, the title "bbb" is in a title section 406, and the file name "yyy.pdf" is in a file name section 408. A body section 410 is blank. Then, when receiving an operation for sending the e-mail 400, the PC 100B sends the e-mail 400 in T210. The e-mail 400 is sent to the server 200 since it includes the e-mail address "p1@print.com" as the recipient e-mail address.

When receiving the e-mail 400 from the PC 100B in T210 (YES in S10 of FIG. 3), the server 200 specifies the e-mail address "p1@print.com" in the recipient e-mail address section 404 of the e-mail 400 (S12). The server 200 then determines that the specified recipient e-mail address does not include a general address (NO in S14), determines that the sender e-mail address "u2@user.com" of the e-mail 400 is registered in the notification list 238 (YES in S40), and determines that the specified recipient e-mail address does not include a non-stored address (NO in S50 of FIG. 4). Then, the server 200 specifies the printer ID "pr1" corresponding to the print address "p1@print.com" included in the specified recipient e-mail address in the address table 240, and specifies the printer 10A corresponding to the printer ID "pr1" as a target printer (NO in S60, S70). The server 200 generates print data PD2 by converting the image file "yyy.pdf" attached with the e-mail 400 in T220. T222 to T240 are the same as T122 to T140 of FIG. 5 except that the print data PD2 and an e-mail 420 are communicated. Contents in a sender e-mail address section 422, a title section 426, and a body section 430 of the e-mail 420 are the same as the contents in the sender e-mail address section 322, the title section 326, and the body section 330 of the e-mail 320 shown in FIG. 5, respectively. The sender e-mail address "u2@user.com" is in a recipient e-mail address section 424 of the e-mail 420.

Figure 7:
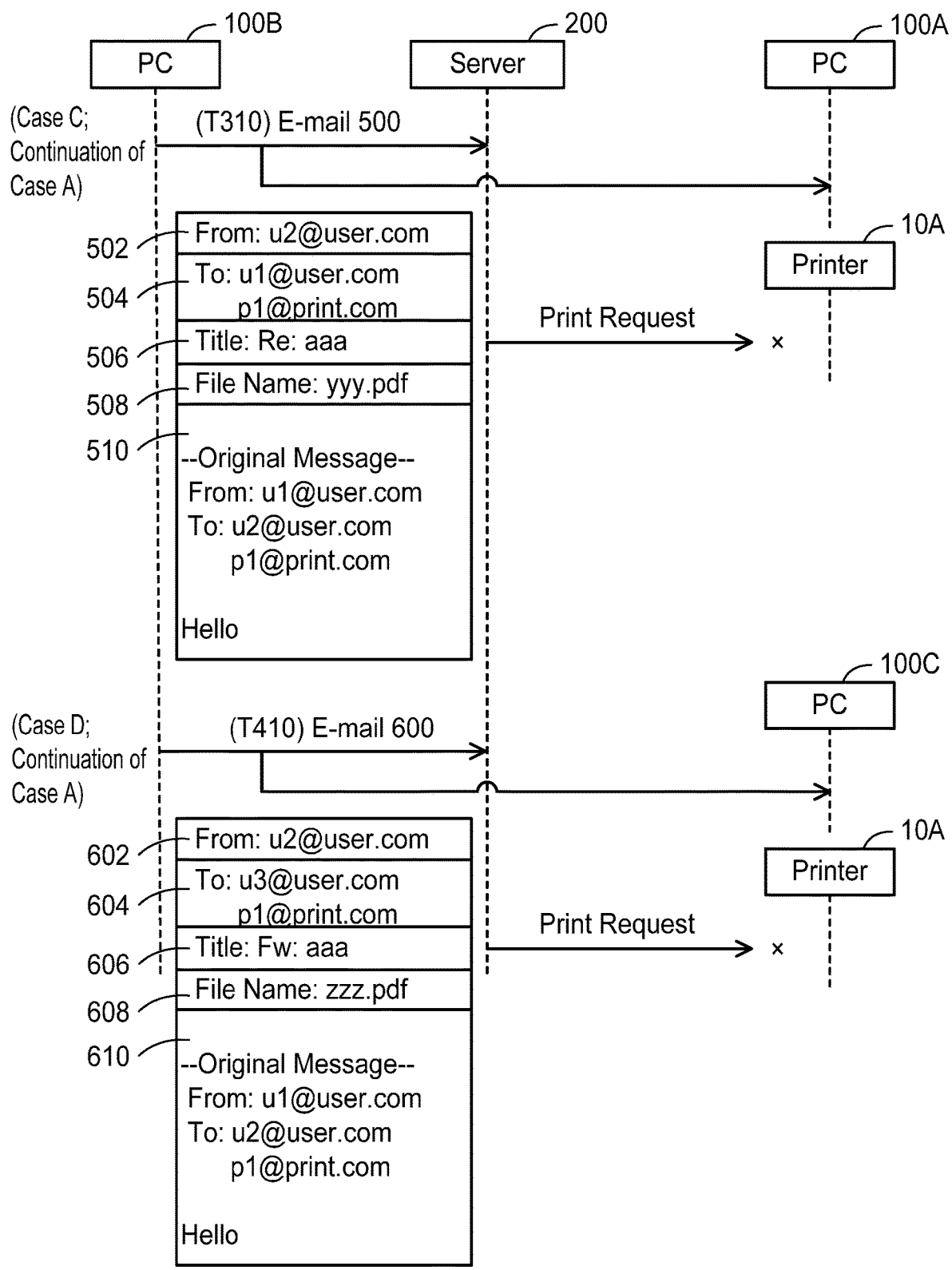
FIG. 7 shows a sequence diagram for Cases C and D in which the e-mail print function is not executed after Case A.

(Case C: FIG. 7)

Next, referring to FIG. 7, Case C will be described. In Case C, the e-mail print function is not executed after the e-mail 300 has been sent from the PC 100A. Case C takes place after Case A. That is, the PC 100B has already received the e-mail 300.

The PC 100B generates an e-mail 500 when receiving an operation for replying to the mail 300 and an operation for attaching an image file having a file name "yyy.pdf". In this case, the PC 100B generates the e-mail 500 in which the sender e-mail address "u2@user.com" is in a sender e-mail address section 502, the recipient e-mail addresses "u1@user.com" and "p1@print.com" are in a recipient e-mail address section 504, a title "Re: aaa" is in a title section 506, and contents related to the e-mail 300 (the sender e-mail address, the recipient addresses, and the text of the e-mail 300) are in a body section 510, in the present case, the user of the PC 100B wishes to send the image file having the file name "yyy.pdf" to the PC 100A by using the e-mail 300. For this reason, the user of the PC 100B is supposed to delete the e-mail address "p1@print.com" from the recipient e-mail address section 504 and also delete the character string including the prim address "p1@print.com" written in the body section 510. However, in the present case, the user of the PC 100B performs an operation for sending the e-mail 500 without deleting the e-mail address "p1@print.com" from the recipient e-mail address section 504 nor deleting the content related to the e-mail 300 from the body section 510. When receiving the operation for sending the e-mail 500, the PC 100B sends the e-mail 500 in T310. The e-mail 500 is sent to the PC 100A and the server 200 since it includes the e-mail addresses "u1@user.com" and "p1@print.com" as the recipient e-mail addresses.

When receiving the e-mail 500 from the PC 100B in T310 (YES in S10 of FIG. 3), the server 200 specifies the recipient e-mail addresses "u1@user.com" and "p1@print.com" of the e-mail 500 (S12). Then, the server 200 determines that the specified recipient e-mail addresses include the general address "u1@user.com" (YES in S14) and determines that the print address "p1@print.com" is written in the body section 510 (YES in S20). In this case, the server 200 does not send a print request to the printer 10A. Thus, it is possible to prevent the e-mail print function from being executed in a case where a print address is written in the body section 510 of the e-mail 500 despite the user not wishing the e-mail print function to be executed.

(Case D; FIG. 7)

Next, referring to FIG. 7, Case D will be described. In Case D, the e-mail print function is not executed after the e-mail 300 has been sent from the PC 100A. Case D takes place after Case A. That is, the PC 100B has already received the e-mail 300.

The PC 100B generates an e-mail 600 when receiving an operation for forwarding the e-mail 300 and an operation for adding the e-mail addresses "u3@user.com" and "p1@print.com" to a recipient e-mail address section. Contents in sections 602 and 610 of the e-mail 600 are the same as the contents in the sections 502 and 510 of the e-mail 500, respectively. Content in a file name section 608 is the same as the content in the file name section 308 of the e-mail 300 shown in FIG. 5. Further, in the e-mail 600, the recipient e-mail addresses "u3@user.com" and "p1@print.com" are in a recipient e-mail address section 604 and "Fw: aaa" is in a title section 606. In the present case, the user of the PC 100B wishes to forward the image file attached with the e-mail 300 to the user of the PC 100C. In this case, the user of the PC 100B is supposed to add only the e-mail address "u3@user.com" to the recipient e-mail address section. However, in the present case, the user of the PC 100B adds not only the e-mail address "u3@user.com" but also the e-mail address "p1@print.com" to the recipient e-mail address section, and then performs an operation for sending the e-mail 600. When receiving the operation for sending the e-mail 600, the PC 100B sends the e-mail 600 in T410. The e-mail 600 is sent to the PC 1000 and the server 200 since it includes the e-mail addresses "u3@user.com" and "p1@print.com" as the recipient e-mail addresses.

When receiving the e-mail 600 from the PC 100B in T410 (YES in S10 of FIG. 3), the server 200 specifies the recipient e-mail addresses "u3@user.com" and "p1@print.com" of the e-mail 600 (S12). Then, the server 200 determines that the specified recipient e-mail addresses include the general address "u3@user.com" (YES in S14) and determines that the print address "p1@print.com" is written in the body section 610 (YES in S20). In this case, the server 200 does not send a print request to the printer 10A.

Figure 8:
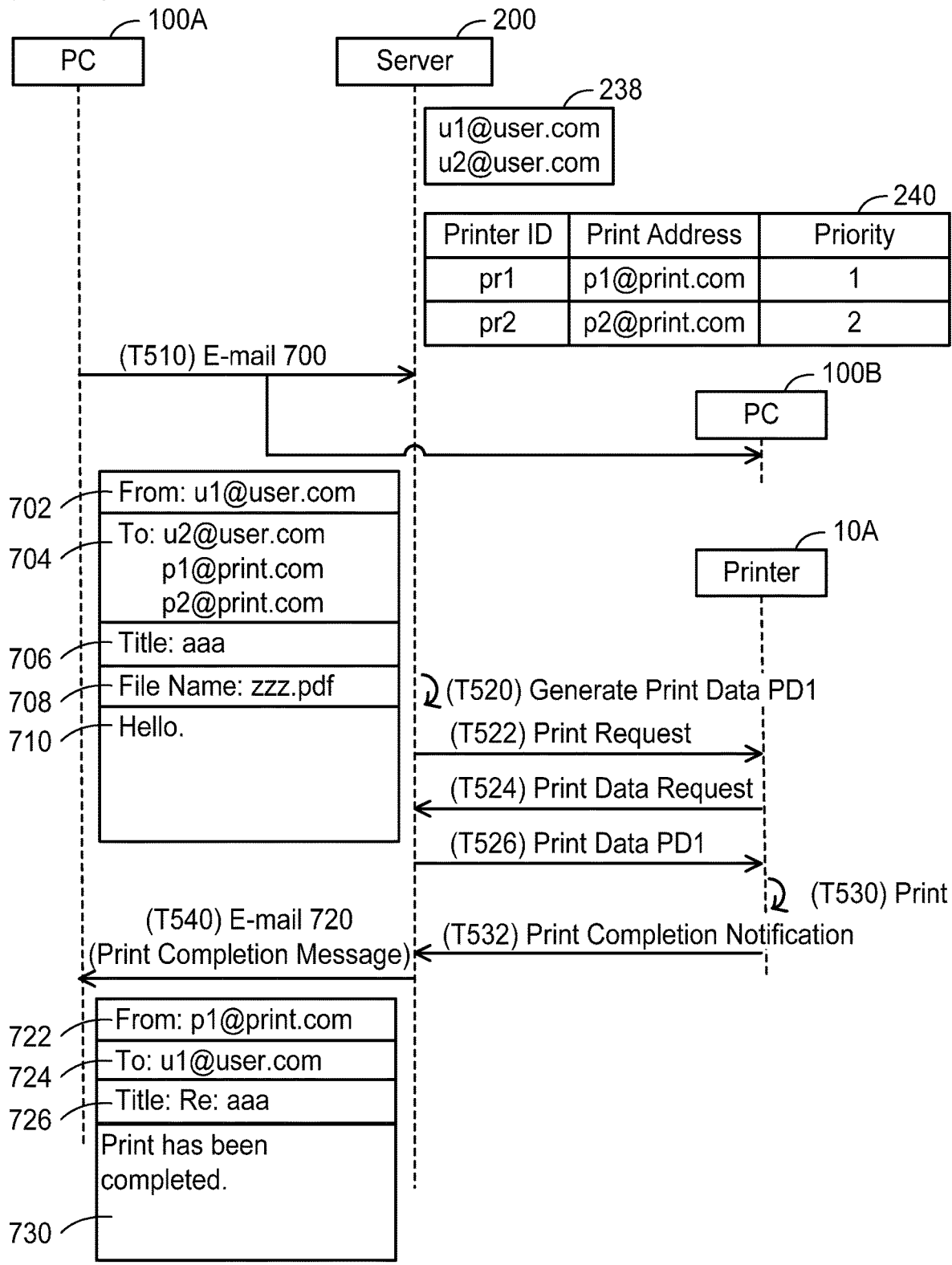
FIG. 8 shows a sequence diagram for Case E in which an e-mail including two print addresses as recipient e-mail addresses is sent.

(Case E; FIG. 8)

Next, referring to FIG. 8, Case E will be described. In Case E, an e-mail 700 that includes two print addresses as recipient e-mail addresses is sent. An initial state of Case F is the same as the initial state of Case A.

The PC 100A generates the e-mail 700 when receiving an operation for generating an e-mail, an operation for adding the e-mail addresses "u2@user.com", "p1@print.com", and "p2@print.com" to a recipient e-mail address section, an operation for writing a character string "aaa" in a title section, an operation for writing a character string "Hello" in a body section, and an operation for attaching an image file having a file name "zzz.pdf". Contents in sections 702, 706, 708, and 710 of the e-mail 700 are the same as the contents in the sections 302, 306, 308, and 310 of the e-mail 300 shown in FIG. 5. Further, in the e-mail 700, the recipient e-mail addresses "u2@user.com", "p1@print.com", and "p2@print.com" are in a recipient e-mail address section 704. Then, when receiving an operation for sending the e-mail 700, the PC 100A sends the e-mail 700 in T510. The e-mail 700 is sent to the PC 100B and the server 200 since it includes the e-mail addresses "u2@user.com", "p1@print.com", and "p2@printer.com" as the recipient e-mail addresses.

When receiving the e-mail 700 from the PC 100A in T510 (YES in S10 of FIG. 3), the server 200 specifies the recipient e-mail addresses "u2@user.com", "p1@print.com", and "p2@print.com" of the e-mail 700 (S12). Then, the server 200 determines that the specified recipient e-mail addresses include the general address "u2@user.com" (YES in S14) and determines that no print addresses are written in the body section 710 (NO in S20). The server 200 then determines that the sender e-mail address "u1@user.com" of the e-mail 700 is registered in the notification list 238 (YES in S40), determines that the specified recipient e-mail addresses do not include a non-stored address (NO in S50), and determines that the specified recipient e-mail addresses include two print addresses "p1@print.com" and "p2@print.com" (YES in S60). The server 200 then specifies the priorities "1" and "2" associated with the two print addresses "p1@print.com" and "p2@print.com" in the address table 240 (S62). Then, the server 200 specifies the printer ID "pr1" associated with the higher-priority print address "p1@print.com" in the address table 240 and specifies the printer 10A corresponding to the printer ID "pr1" as a target printer (S64). The server 200 then generates print data PD1 in T520. T522 to T532 are the same as T122 to T132 of FIG. 5. The server 200 sends an e-mail 720 in T540. Contents in sections 722, 724, 726, and 730 of the e-mail 720 are the same as the contents in the sections 322, 324, 326, and 330 of the e-mail 320.

(Effects of Case E)

As shown in Case E, when the e-mail 700 including two print addresses "p3@print.com" and "p2@print.com" as the recipient e-mail addresses is received, the server 200 sends a print request only to the printer 10A corresponding to the higher priority in the memory 234 (T522). According to such a configuration, it is possible to prevent the e-mail print function from being executed by two printers when an e-mail including two print addresses is received. For example, if a third party obtains two print addresses and an e-mail including the two print addresses is received from the third party, it is possible to prevent the e-mail print function from being executed by the two printers. Thus, unnecessary printing can be prevented.

Figure 9:
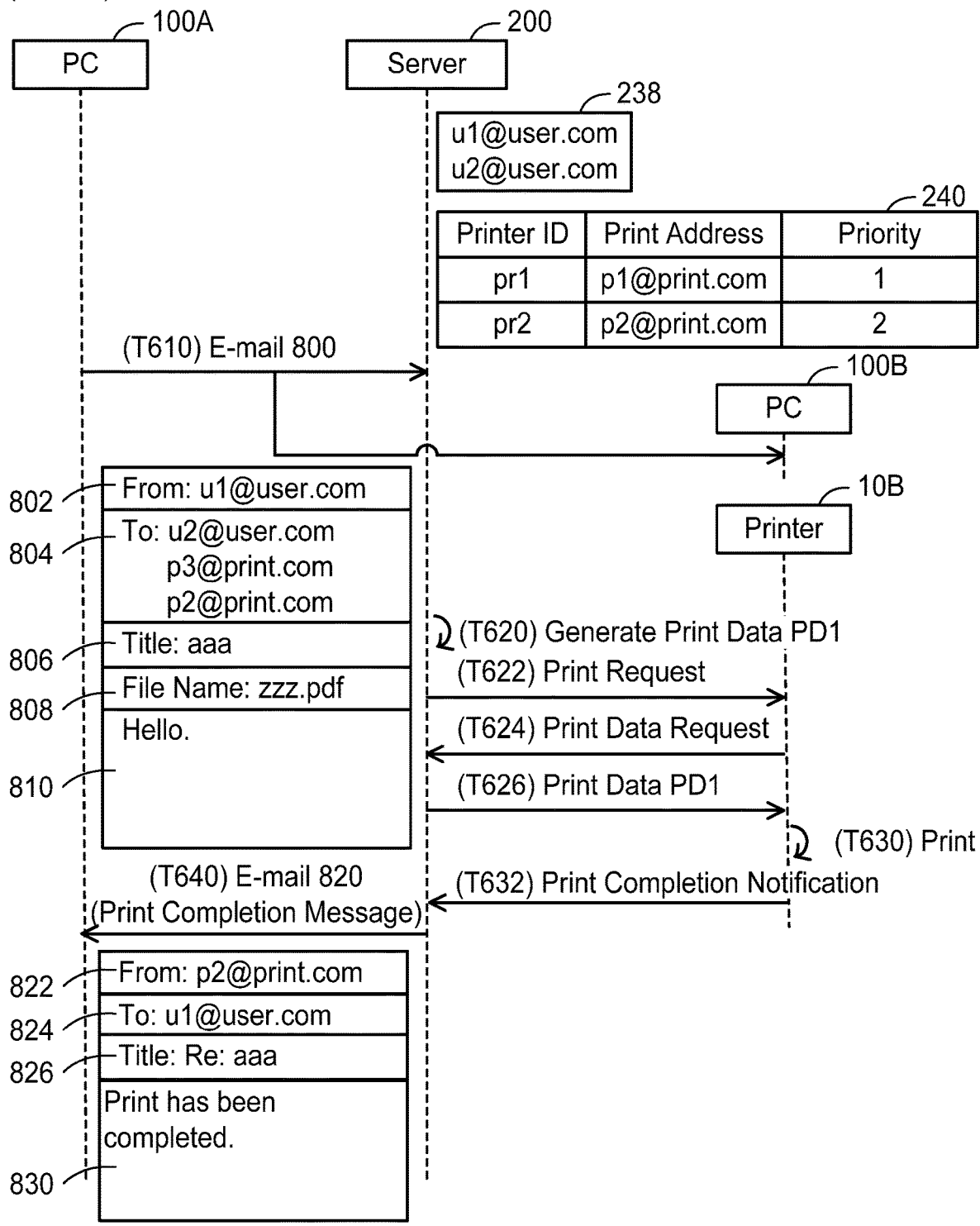
FIG. 9 shows a sequencing diagram for Case F in which an e-mail including a wrong e-mail address as a recipient e-mail address is sent.

(Case F: FIG. 9)

Next, refring to FIG. 9, Case F will be described. In Case F, an e-mail 800 that includes a wrong e-mail address as a recipient e-mail address is sent. An initial state of Case F is the same as the initial state of Case A shown in FIG. 5. The present case assumes that the user of the PC 100A enters the e-mail address "p3·print.com" even though the e-mail address "p1@print.com" is supposed to be entered.

The PC 100A generates the e-mail 800 when receiving an operation for generating an e-mail, an operation for adding the e-mail addresses "u2@user.com", "p3@print.com", and "p2@print.com" to a recipient e-mail address section, an operation for writing a character string "aaa" in a title section, an operation for writing a character string "Hello" in a body section, and an operation for attaching an image file having file name "zzz.pdf". Contents in sections 802, 806, 808, and 810 of the e-mail 800 are the same as the contents in the sections 302, 306, 308, and 310 of the e-mail 300 shown in FIG. 5. Further, the e-mail addresses "u2@user.com", "p3@print.com", and "p2@print.com" are in a recipient e-mail address section 804 of the e-mail 800. When receiving an operation for sending the e-mail 800, the PC 100A sends the e-mail 800 in T610. The e-mail 800 is sent to the PC 100B and the server 200 since it includes the e-mail addresses "u2@user.com" and "p2@print.com" as the recipient e-mail addresses.

When receiving the e-mail 800 from the PC 100A in T610 (YES in S10 of FIG. 3), the server 200 specifies the recipient e-mail addresses "u2@user.com", "p3@print.com", and "p2@print.com" of the e-mail 800 (S12). Then, the server 200 determines that the specified recipient e-mail addresses include the general address "u2@user.com" (YES in S14) and determines that no print addresses are written in the body section 810 (NO in S20). The server 200 then determines that the sender e-mail address "u1@user.com" of the e-mail 800 is registered in the notification list 238 (YES in S40), determines that the specified recipient e-mail addresses include the non-stored address "p3@print.com" (YES in S50), excludes the non-stored address "p3@print.com" from the specified recipient e-mail addresses (S52), and determines that one print address "p2@print.com" is included in the e-mail 800 (NO in S54, NO in S60). Then, the server 200 specifies the printer ID "pr2" corresponding to the print address "p2@print.com" included in the specified recipient e-mail addresses in the address table 240, and specifies the printer 10B corresponding to the printer ID "pr2" as a target printer (S70). The server 200 then generates print data PD1 in T620. T622 to T632 are the same as T122 to T132 of FIG. 5 except that the communication counterpart is the printer 10B. The server 200 sends an e-mail 820 in T640. The e-mail address "p2@print.com" is in a sender e-mail address section 822 of the e-mail 820. Contents in a recipient e-mail address section 824, a title section 826 and a body section 830 of the e-mail 820 are the same as the contents in the recipient e-mail address section 324, the title section 326 and the body section 310 of the e-mail 320 shown in FIG. 5, respectively.

(Effects of Case F)

As shown in Case F, when the e-mail 800 is received, the server 200 excludes "p3@print.com" that includes the domain name "print.com" of the server 200 and is not stored in the memory 234, from among the specified recipient e-mail addresses "u2@user.com", "p3@print.com", and "p2@print.com". Then, after "p3@print.com" has been excluded from the specified recipient e-mail addresses, the server 200 specifies "p2@print.com" from among the specified recipient e-mail addresses and sends a print request to the printer 10B (T622). According to such a configuration, the time required for data printing can be reduced.

Figure 10:
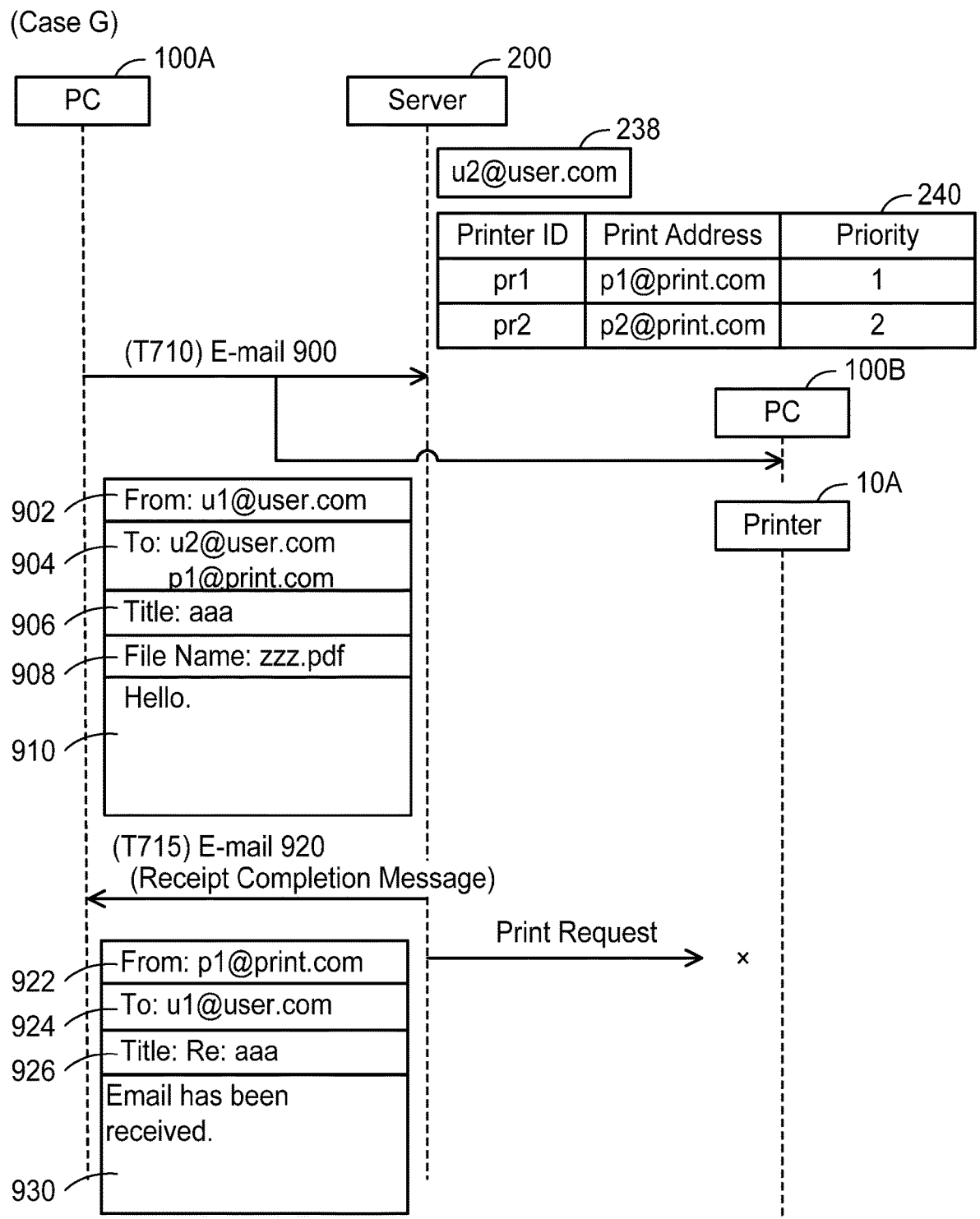
FIG. 10 is a sequence diagram for Case G in which the e-mail print function is not executed.

(Case G; FIG. 10)

Next, referring to FIG. 10, Case G will be described. In Case G, the e-mail print function is not executed. An initial state of Case C is the same as the initial state of Case A except that the e-mail address "u1@user.com" is not registered in the notification list 238.

First, the PC 100A generates an e-mail 900. Contents in sections 902, 904, 906, 908, and 910 of the e-mail 900 are the same as the contents in the sections 302, 304, 306, 308, and 310 of the e-mail 300 shown in FIG. 5. When receiving an operation for sending the e-mail 900, the PC 100A sends the e-mail 900 in T710.

When receiving, the e-mail 900 from the PC 100A in T710 (YES in S10 of FIG. 3), the server 200 specifies the recipient e-mail addresses "u2@user.com" and "p1@print.com" of the e-mail 900 (S12). Then, the server 200 determines that the specified recipient e-mail addresses include the general address "u1@user.com" (YES in S14) and determines that no print addresses are written in the body section 910 (NO in S20). The server 200 then determines that "u1@user.com", which is the sender e-mail address of the e-mail 900, is not registered in the notification list 238 (NO in S40) and generates an e-mail 920 that includes a receipt completion message (a character string "E-mail has been received") indicating that the e-mail 900 has been received. Contents in sections 922, 924, and 926 of the e-mail 920 are the same as the contents in the sections 322, 324, and 326 of the e-mail 320, respectively. The receipt completion message is written in a body section 930 of the e-mail 920. The server 200 sends the e-mail 920 in T715 (S90). The e-mail 920 is sent to the PC 100A since it includes the e-mail address "u1@user.com" as the recipient e-mail address.

(Effects of Cases A and G)

As shown in Case A of FIG. 5, in the case where the sender e-mail address "u1@user.com" of the e-mail 300 is stored in the notification list 238 and the print completion notification is received from the printer 10A (T132), the server 200 sends the e-mail 320 including the e-mail address "u1@user.com" as the recipient e-mail address. On the other hand, as shown in Case G of FIG. 10, in the case where the sender e-mail address "u1@user.com" of the e-mail 900 is not stored in the notification list 238, the server 200 sends the e-mail 920 including the receipt completion message (T715 of FIG. 10). According to such a configuration, whether to send an e-mail including the print completion message or to send an e-mail including the receipt completion message can be appropriately switched depending on whether the sender e-mail address is stored in the notification list 238 or not.

Further, as shown in Case A of FIG. 5, the server 200 sends a print request to the printer 10A in the case where the sender e-mail address "u1@user.com" mail 300 is stored in the notification list 238 (T122). On the other hand, as shown in Case G of FIG. 10, a print request is not sent in the case where the sender e-mail address "u1@user.com" of the e-mail 900 is not stored in the notification list 238. According to such a configuration, whether to send a print request or not can be appropriately switched depending on whether the sender e-mail address is stored in the notification list 238 or not. Thus, users of the printers 10A and 10B and the administrator of the printers 10A and 10B can appropriately manage users who are permitted to use the e-mail print function.

Further, as shown in Case A of FIG. 5, the server 200 sends a print request to the printer 10A in the case where the sender e-mail address "u1@user.com" of the e-mail 300 is stored in the notification list 238 (T122), and sends the e-mail 320 including the print completion message (T140) in the case of receiving the print completion notification from the printer 10A (T132). On the other hand, as shown in Case G of FIG. 10, the server 200 sends the e-mail 920 including the receipt completion message (T915) and does not send a print request in the ease where the sender e-mail address "u1@user.com" of the e-mail 900 is not stored in the notification list 238. According to such a configuration, the server 200 can appropriately switch whether to send an e-mail including the print completion message or to send an e-mail including the receipt completion message, depending on whether the user using the sender e-mail address can use the e-mail print function or not. Users corresponding to e-mail addresses registered in the notification list 238 are permitted to use the e-mail print function. It is advantageous to provide information on the printers 10A and 10B to such users. On the other hand, users corresponding to e-mail addresses that are not registered in the notification list 238 are not permitted to use the e-mail print function. Such users may include users of the printers 10A and 10B and third parties different from the users of the printers 10A and 10B. It is undesirable to provide information on the printers 10A and 10B to third parties from a security standpoint. According to the above configuration, in the case where the server 200 receives an e-mail including an e-mail address corresponding to a third party as a sender e-mail address (YES in S10 of FIG. 3), the server 200 determines that the e-mail address is not registered in the notification list 238 (NO in S40 of FIG. 4) and sends an e-mail including the receipt completion message without sending an e-mail including the print completion message (S90). Thus, the security for the printers 10A and 10B can be enhanced.

(Effects of Cases A to G)

In the case where the server 200 receives from the PC 100A the e-mail 300 including the print address "p1@print.com" and the general address "u2@print.com" as the recipient e-mail addresses (T110 in FIG. 3), the server 200 sends a print request to the printer 10A (T122 in FIG. 5). Then, after receiving the e-mail 300 from the PC 100A, the server 200 receives, from the PC 100B, the e-mails 400, 500, and 600 including the print address "p1@print.com" and the general address "u2@user.com" as the recipient e-mail addresses (T210 in FIG. 6, T310 and T410 in FIG. 7). In the case where the server 200 determines that the e-mail 400 was not generated by using the e-mail 300, it sends a print request to the printer 10A (T222 in FIG. 6). On the other hand, in the case where the server 200 determines that the e-mails 500 and 600 were generated by using the 300, it does not send a print request to the printer 10A. Thus, when receiving the e-mails 400, 500, and 600 in which a plurality of e-mail addresses is designated as recipient e-mail addresses, the server 200 can appropriately switch whether to cause the printer 10A to execute printing or not depending on whether the e-mails 400, 500, and 600 were generated by using the e-mail 300 or not. In particular, in the present embodiment, the server 200 determines that the e-mails 500 and 600 were generated by using the e-mail 300 in the case where an e-mail address stored in the address table 240 in the memory 234 (i.e., a print address) is written in the bodies of the e-mails 500 and 600 (see FIG. 7), while it determines that the e-mail 400 was not generated by using the e-mail 300 in the case where an e-mail address stored in the address table 240 in the memory 234 (i.e., a print address) is not written in the body of the e-mail 400 (see FIG. 6). As shown in the body section 510 of the e-mail 500 in FIG. 7, when the operation for replying to the e-mail 300 is performed, the recipient e-mail addresses of the original e-mail 300 are written in the body section of the e-mail. Thus, it is possible to appropriately determine whether the e-mails 400, 500 and 600 were generated by using the e-mail 300 or not depending on whether a print address is written in the body sections of the e-mails or not. The same applies to forwarded e-mails.

(Correspondence Relationships)

The printer 10A is an example of a "first printer". The printer ID is an example of "printer identification information". The PC 100A and the PC 100B are examples of a "first external device" and a "second external device", respectively. The memory 234 of the server 200 is an example of a "memory". The e-mail 300 in FIG. 5, the e-mail 700 in FIG. 8, and the e-mail 800 in FIG. 9 are examples of a "first e-mail". The image file having the file name "zzz.pdf" is an example of a "first image file". The print address "p1@print.com" is an example of "first print address". The general address "u2@user.com" is an example of a "first general address". The print request of T122 in FIG. 5, the print request of T522 in FIG. 8, and the print request of T622 in FIG. 9 are examples of a "first print request". The printer ID "pr1" is an example of "first printer identification information". The e-mail 400 in FIG. 6 and the e-mails 500 and 600 in FIG. 7 are examples of a "second e-mail". The image file having the file name "zzz.pdf" and the image file having the file name "yyy.pdf" are examples of a "second image file". The general addresses "u2@user.com" and "u3@user.com" are examples of a "second general address". The print request of T222 in FIG. 6 is an example of a "second print request".

The domain name "print.com" of the server 200 is an example of a "predetermined domain". The e-mail address "p3@print.com" in FIG. 9 is an example of a "specific e-mail address".

The printer 10B is art example of a "second printer". The printer ID "pr2" is an example of "second primer identification information". The print address "p2@print.com" is an example of a "second print address". In the address table 240, the priority "1" associated with the print address "p1@print.com" and the priority "2" associated with the print address "p2@print.com" are examples of a "first priority" and a "second priority", respectively. The e-mail addresses in the notification list 238 are examples of a "notification address". The "u1@user.com" in the sender e-mail address section 302 of the e-mail 300 in FIG. 5 and "u1@user.com" in the sender e-mail address section 902 of the e-mail 900 in FIG. 10 are examples of a "sender e-mail address". The e-mail 320 in FIG. 5 is an example of a "third e-mail". The print completion message is an example of "print completion information". The e-mail 920 in FIG. 10 is an example of a "fourth e-mail". The receipt completion message is an example of "receipt information".

S10 in FIG. 3 is an example of "receive a first e-mail including a first image file" and "receive a second e-mail including a second image file". S80 in FIG. 4 is an example of "send a first print request to a first printer" and "send a second print request to the first printer". S20 in FIG. 3 is an example of "determine whether the second e-mail was generated by using the first e-mail".

Second Embodiment

The present embodiment is different from the first embodiment in the process of S20 in FIG. 3. In S20 of FIG. 3, the CPU 232 of the server 200 determines whether a character siring "Re" or "Fw" is in the title section of the e-mail received in S10 or not to determine whether the received e-mail was generated by using an e-mail the server 200 had received previously. The CPU 232 ends the process of FIG. 3 in a ease where the character string "Re" or "Fw" is included in the title section of the received e-mail (YES in S20). On the other hand, the CPU 232 proceeds to S30 in a case where the character string "Re" or "Fw" is not included in the title section of the received e-mail (NO in S20).

For example, in Case B of FIG. 6, the server 200 determines that the character string "Re" or "Fw" is not included in the title section 406 of the e-mail 400 (NO in S20 of FIG. 3). In this case, as in the first embodiment, the server 200 sends a print request to the printer 10A in T222. On the other hand, in Case C of FIG. 7, the server 200 determines that the character string "Re" is included in the title section 506 of the e-mail 500 (YES in S20). In this ease, as in the first embodiment, a print request is not sent to the printer 10A.

As shown in the title section 506 of the e-mail 500 in FIG. 7, when the operation for replying to the e-mail 300 is performed, the character string "Re" is written in the title section of the e-mail. Thus, it is possible to appropriately determine whether the e-mails 400 and 500 were generated by using the e-mail 300 or not based on whether the character string "Re" is written in the title sections of the e-mails. The same applies to forwarded e-mails.

Third Embodiment

The present embodiment is different from the first embodiment in the process of S20 in FIG. 3. In the present embodiment, the CPU 232 of the server 200 is configured to store, when receiving an e-mail with which an image file is attached, the file name written in the file name section of the e-mail in the memory 234. In S20 of FIG. 3, the CPU 232 determines whether the file name written in the file name section of the e-mail received in S10 (which may be referred to as "target file name") matches the file name stored in the memory 234 or not to determine whether the received e-mail was generated by using an e-mail the server 200 had received previously. The CPU 232 ends the process of FIG. 3 in a case where the file names match (YES in S20). On the other hand, the CPU 232 proceeds to S30 in a case where the file names do not match (NO in S20).

For example, in Case A of FIG. 5, the server 200 stores the file name "zzz.pdf" when receiving the e-mail 300. Then, in Case B of FIG. 6, the server 200 determines that the file name "yyy.pdf" written in the file name section 408 of the e-mail 400 does not match the file name "zzz.pdf" stored in the memory 234 (NO in S20 of FIG. 3). In this case, as in the first embodiment, the server 200 sends a print request to the printer 10A in T222. On the other hand, in Case D of FIG. 7, the server 200 determines that the file name "zzz.pdf" written in the file name section 608 of the e-mail 600 matches the file name "zzz.pdf" stored in the memory 234 (YES in S20). In this case, as in the first embodiment, a print request is not sent to the printer 10A.

Receiving an e-mail with which the same image file as a previously received image file is attached means that the e-mail is highly likely a forwarded e-mail. Thus, it is possible to appropriately determine whether the e-mail 600 was generated by using the e-mail 300 or not by determining, whether the file name written in the file name section of the received e-mail matches the file name stored in the memory 234 or not.

(First Variant) The "server" may be configured of two or more servers.

(Second Variant) In S20 of FIG. 3, the CPU 232 of the server 200 may determine whether a print address is written in the body section (e.g., 310 of FIG. 5) which is an area indicative of text of the e-mail received in S10 and also determine whether the character string "Re" or "Fw" is included in the title section of the e-mail received in S10. The CPU 232 may execute any combination of the processes of S20 in the first to third embodiments.

(Third Variant) S50 to S54, S60, S62, and S70 of FIG. 4 may be omitted. In this variant, in S64, the CPU 232 of the server 200 extracts, from among the e-mail addresses including the name "print.com" of the server 200, a first e-mail address that is written first in the recipient e-mail address section of the received e-mail. Then, the CM 232 determines whether the first e-mail address is a non-stored address or not. In a case where the first e-mail address is not a non-stored address (i.e., the first e-mail address is a print address), the CPU 232 specifies the printer ID associated with the first e-mail address in the address table 240 and executes the processes from S80 and onwards. On the other hand, in a case where the first e-mail address is a non-stored address, the CPU 232 extracts a second e-mail address that is written after the first e-mail address in the recipient e-mail address section of the received e-mail and determines whether the second e-mail address is a non-stored address or not. The CPU 232 repeats the above process until a print address is specified. In a case where it is determined that all the e-mail addresses including the domain "print.com" of the server 200 are non-stored addresses, the CPU 232 executes the process of S90 and then ends the process of FIG. 4. The order of extracting an e-mail address from among two or more e-mail addresses written in the recipient e-mail address section of the received e-mail may be random. In this variant, "specify the first print address" can be omitted.

(Fourth Variant) The priorities may not be stored in the address table 240 of the server 200. In this variant, in SM, the server 200 may specify all the printers corresponding to the two or more print addresses written in the recipient e-mail address section of the received e-mail as target printers.

(Fifth Variant) The memory 234 of the server 200 may not store the notification list 238. In this variant, S40 and S90 of FIG. 4 can be omitted. In this variant, "send a fourth e-mail including the sender e-mail address as a recipient e-mail address" can be omitted. Further, S84 may be omitted. In addition, "send a third e-mail including the sender e-mail address as a recipient e-mail address" can be omitted in this variant.

(Sixth Variant) An e-mail address corresponding to a user who is not permitted to use the e-mail print function may be registered in the notification list 238 of the server 200.

(Seventh Variant) After S90 of FIG. 4, the same processes as S50 to S82 may be executed. In this variant, e-mail addresses registered in the notification list 238 are e-mail addresses to which an e-mail including the print completion message is to be sent.

(Eighth Variant) In a variant of the third embodiment, when the server 200 receives an e-mail with which an image file is attached, the server 200 may store the sender e-mail address of the e-mail and a general address written in the recipient e-mail address section in association with the file name written in the file name section of the e-mail. In the present variant, in S20 of FIG. 3, the CPU 232 determines whether the target file name matches the file name stored in the memory 234 or not and also determines whether the sender e-mail address of the received e-mail matches the e-mail address associated with the target file name in the memory 234.

(Ninth Variant) Whether to cause the server 200 to execute the process using the notification list 238 (S40 in FIG. 4) (which may be referred to as "notification list process" hereinafter) or not may be settable. In this variant, the memory 234 of the server 200 stores notification list information that indicates one of: a value "ON" indicating that the notification list process is allowed to be executed and a value "OFF" indicating that the notification list process is not allowed to be executed. The notification list information is set by the users of the printers 10A and 10B and the administrator of the printers 10A and 10B. In this variant, the CPU 232 executes the processes of S40 to S90 in a case where the notification list information is "ON". On the other hand, the CPU 232 executes the processes of S50 to S84 in a case where the notification list information is "OFF". According to such a configuration, the server 200 sends a print request to the printers 10A and 10B in a case where it receives, from a target PC, an e-mail including an e-mail address registered in the notification list 238 (i.e., an e-mail address corresponding to a user who is permitted to use the e-mail print function) as a recipient e-mail address while the notification list information is "ON". Meanwhile, the server 200 does not send a print request to the printer 10A nor the printer 10B in a case where it receives, from the target PC, an e-mail including an e-mail address that is not registered in the notification list 238 (i.e., an e-mail address corresponding to a user who is not permitted to use the e-mail print function) as a recipient e-mail address while the notification list information is "ON". Further, the server 200 sends a print request to the printers 10A and 10B in a case where it receives an e-mail from the target PC while the notification list information is "OFF", regardless of the sender e-mail address of the e-mail. Thus, the users of the printers 10A and 10B and the administrator of the printers 10A and 10B can more appropriately manage users who are permitted to use the e-mail print function. When the notification list information is "OFF", the CPU 232 may omit S82 and S84. In this case, the CPU 232 executes S80 or S90 after S64 or S70. According to such a configuration, sending of an e-mail including information on the printers 10A and 10B (e.g., print completion message) to a user who uses an e-mail address that is not registered in the notification list can be prevented while the notification list information is "OFF".

(Tenth Variant) The server 200 may store notification lists for the printers 10A and 10B, respectively. In this variant, the CPU 232 of the server 200 executes the same process as S40 after S64 or S70 in FIG. 4. That is, after the target printer has been specified, the CPU 232 uses the notification list for the target printer to determine whether the sender e-mail address of the received e-mail is registered in the notification list or not. In this variant, the CPU 232 executes the processes from S80 and onward in a case where it determines that the sender e-mail address of the received e-mail is registered in the notification list. On the other hand, the CPU 232 executes S90 in a case where it determines that the sender e-mail address of the received e-mail is not registered in the notification list. In another variant, the notification list information may be stored in the memory 234 of the server 200. In this variant, the CPU 232 determines whether the notification list information is "ON" or not after S64 or S70. In a case where the notification list information is "ON", the CPU 232 executes the same process as S40. Then, the CPU 232 executes the processes of 880 and onward in a case where the sender e-mail address of the received e-mail is registered in the notification list for the target printer. On the other hand, the CPU 232 executes the process of S90 in a case where the sender c-mail address of the received e-mail is not registered in the notification list for the target printer. In a case where the notification list information is "OFF", the CPU 232 executes the processes of S80 and onward. In the case where the notification list information is "OFF", the CPU 232 may omit S82 and S84. In the case of omitting S82 and S84, the CPU 232 may execute S90 after S64 or S70, and then execute S80.

(Eleventh Variant) In the above-described embodiments, a print address is written in the sender e-mail address section of an e-mail sent from the server 200. For example, the print address "p1@print.com" is written in the sender e-mail address section 322 of the e-mail 320 shown in FIG. 5. In a variant, an e-mail address for the server 200 (e.g., "server@print.com") may be written in the sender e-mail address section of an e-mail sent from the server 200.

(Twelfth Variant) In the above-described embodiments, each of the processes of FIGS. 2 to 10 is implemented by software (e.g., the program 36, 236), however, at least one of these processes may be implemented by hardware such as a logic circuit.

What is claimed is:

1. A sever comprising:
a memory configured to store, for each of one or more e-mail addresses, the e-mail address and printer identification information for identifying a printer in association with each other; and
a controller,
wherein the controller is configured to:
receive a first e-mail including a first image file from a first external device, the first e-mail including, as recipient e-mail addresses, a first print address that is an e-mail address stored in the memory and a first general address that is an e-mail address that is not stored in the memory;
in a case where the first e-mail is received from the first external device, send a first print request to a first printer, the first print request being a signal for requesting a first image corresponding to the first image file included in the first e-mail to be printed, and the first printer being a printer identified by first printer identification information stored in the memory in association with the first print address;
after the first e-mail has been received from the first external device, receive a second e-mail including a second image file from a second external device, the second e-mail including, as recipient e-mail addresses, the first print address and a second general address that is an e-mail address that is not stored in the memory;
in a case where the second e-mail is received from the second external device, determine whether the second e-mail was generated by using the first e-mail; and
in a case where it is determined that the second e-mail was not generated by using the first e-mail, send a second print request to the first printer, the second print request being a signal for requesting a second image corresponding to the second image file included in the second e-mail to be printed, wherein in a case where it is determined that the second e-mail was generated by using the first e-mail, the second print request is not sent to the first printer,
wherein the memory is further configured to store a notification address that is an e-mail address to which an e-mail that includes print completion information indicating that printing of an image has been completed is to be sent,
wherein the controller is further configured to:
in a case where a sender e-mail address included in the first e-mail is the notification address and a print completion notification indicating that printing of the first image has been completed is received from the first printer after the first print request has been sent to the first printer, send a third e-mail including the sender e-mail address as a recipient e-mail address, the third e-mail including specific print completion information indicating that printing of the first image has been completed, wherein in a case where the sender e-mail address is not the notification address, the third e-mail is not sent,
wherein in a case where the first e-mail is received from the first external device and the sender e-mail address is the notification address, the controller is configured to send the first print request to the first printer, and
in a case where the first e-mail is received from the first external device and the sender e-mail address is not the notification address, the controller does not send the first print request to the first printer.

2. The server as in claim 1, wherein
in a case where any of the one or more e-mail addresses stored in the memory is written in a body of the second e-mail, the controller is configured to determine that the second e-mail was generated by using the first e-mail, and
in a case where none of the one or more e-mail addresses stored in the memory is written in the body of the second e-mail, the controller is configured to determine that the second e-mail was not generated by using the first e-mail.

3. The server as in claim 1, wherein
in a case where a predetermined character string indicative of reply or a predetermined character string indicative of forwarding is included in a title of the second e-mail, the controller is configured to determine that the second e-mail was generated by using the first e-mail, and
in a case where the predetermined character strings are not included in the title of the second e-mail, the controller is configured to determine that the second e-mail was not generated by using the first e-mail.

4. The server as in claim 1, wherein
in a case where a file name of the first image file matches a file name of the second image file, the controller is configured to determine that the second e-mail was generated by using the first e-mail, and
in a case where the file name of the first image file does not match the file name of the second image file, the controller is configured to determine that the second e-mail was not generated by using the first e-mail.

5. The server as in claim 1, wherein
each of the one or more e-mail addresses stored in the memory includes a predetermined domain,
the first e-mail further includes a specific e-mail address as a recipient e-mail address, wherein the specific e-mail address includes the predetermined domain and is not stored in the memory,
the controller is further configured to:
  in a case where the first e-mail is received from the first external device, specify the first print address that includes the predetermined domain and is stored in the memory from among the first print address, the first general address, and the specific e-mail address, and
the first printer is a printer identified by the first printer identification information stored in the memory in association with the specified first print address.

6. The server as in claim 1, wherein
the memory is further configured to store, for each of the one or more e-mail addresses, the e-mail address, the printer identification information, and a priority in association with each other,
the first e-mail further includes a second print address that is an e-mail address stored in the memory and is different from the first print address,
a first priority stored in the memory in association with the first print address is higher than a second priority stored in the memory in association with the second print address,
the controller is configured to send the first print request only to the first printer corresponding to a higher priority between the first printer and a second printer, and
the second printer is a printer identified by second printer identification information stored in the memory in association with the second print address included in the first e-mail.

7. The server as in claim 1, wherein
the controller is further configured to:
in the case where the sender e-mail address is not the notification address, send a fourth e-mail including the sender e-mail address as a recipient e-mail address, the fourth e-mail including receipt information indicating that the first e-mail has been received.

8. A non-transitory computer-readable recording medium storing computer-readable instructions for a server, wherein
the server comprises:
  a processor; and
  a memory configured to store, for each of one or more e-mail addresses, the e-mail address and printer identification information for identifying a printer in association with each other, and
wherein the computer-readable instructions, when executed by the processor, cause the server to:
receive a first e-mail including a first image file from a first external device, the first e-mail including, as recipient e-mail addresses, a first print address that is an e-mail address stored in the memory and a first general address that is an e-mail address that is not stored in the memory;
in a case where the first e-mail is received from the first external device, send a first print request to a first printer, the first print request being a signal for requesting a first image corresponding to the first image file included in the first e-mail to be printed, and the first printer being a printer identified by first printer identification information stored in the memory in association with the first print address;
after the first e-mail has been received from the first external device, receive a second e-mail including a second image file from a second external device, the second e-mail including, as recipient e-mail addresses, the first print address and a second general address that is an e-mail address that is not stored in the memory;
in a case where the second e-mail is received from the second external device, determine whether the second e-mail was generated by using the first e-mail; and
in a case where it is determined that the second e-mail was not generated by using the first e-mail, send a second print request to the first printer, the second print request being a signal for requesting a second image corresponding to the second image file included in the second e-mail to be printed, wherein in a case where it is determined that the second e-mail was generated by using the first e-mail, the second print request is not sent to the first printer,
wherein the memory is further configured to store a notification address that is an e-mail address to which an e-mail that includes print completion information indicating that printing of an image has been completed is to be sent,
the computer-readable instructions, when executed by the processor, further cause the server to:
  in a case where a sender e-mail address included in the first e-mail is the notification address and a print completion notification indicating that printing of the first image has been completed is received from the first printer after the first print request has been sent to the first printer, send a third e-mail including the sender e-mail address as a recipient e-mail address, the third e-mail including specific print completion information indicating that printing of the first image has been completed, wherein in a case where the sender e-mail address is not the notification address, the third e-mail is not sent,
wherein in a case where the first e-mail is received from the first external device and the sender e-mail address is the notification address, the first print request is sent to the first printer, and
in a case where the first e-mail is received from the first external device and the sender e-mail address is not the notification address, the first print request is not sent to the first printer.

9. A sever comprising:
a memory configured to store, for each of one or more e-mail addresses, the e-mail address and printer identification information for identifying a printer in association with each other; and
a controller,
wherein the controller is configured to:
receive a first e-mail including a first image file from a first external device, the first e-mail including, as recipient e-mail addresses, a first print address that is an e-mail address stored in the memory and a first general address that is an e-mail address that is not stored in the memory;
in a case where the first e-mail is received from the first external device, send a first print request to a first printer, the first print request being a signal for requesting a first image corresponding to the first image file included in the first e-mail to be printed, and the first printer being a printer identified by first printer identification information stored in the memory in association with the first print address;

after the first e-mail has been received from the first external device, receive a second e-mail including a second image file from a second external device, the second e-mail including, as recipient e-mail addresses, the first print address and a second general address that is an e-mail address that is not stored in the memory;

in a case where the second e-mail is received from the second external device, determine whether the second e-mail was generated by using the first e-mail; and in a case where it is determined that the second e-mail was not generated by using the first e-mail, send a second print request to the first printer, the second print request being a signal for requesting a second image corresponding to the second image file included in the second e-mail to be printed, wherein in a case where it is determined that the second e-mail was generated by using the first e-mail, the second print request is not sent to the first printer, wherein the memory is further configured to store a notification address that is an e-mail address to which an e-mail that includes print completion information indicating that printing of an image has been completed is to be sent, the controller is further configured to:
  in a case where a sender e-mail address included in the first e-mail is the notification address and a print completion notification indicating that printing of the first image has been completed is received from the first printer after the first print request has been sent to the first printer, send a third e-mail including the sender e-mail address as a recipient e-mail address, the third e-mail including specific print completion information indicating that printing of the first image has been completed, wherein in a case where the sender e-mail address is not the notification address, the third e-mail is not sent; and
  in the case where the sender e-mail address is not the notification address, send a fourth e-mail including the sender e-mail address as a recipient e-mail address, the fourth e-mail including receipt information indicating that the first e-mail has been received.

10. The server as in claim 9, wherein
in a case where any of the one or more e-mail addresses stored in the memory is written in a body of the second e-mail, the controller is configured to determine that the second e-mail was generated by using the first e-mail, and in a case where none of the one or more e-mail addresses stored in the memory is written in the body of the second e-mail, the controller is configured to determine that the second e-mail was not generated by using the first e-mail.

11. The server as in claim 9, wherein
in a case where a predetermined character string indicative of reply or a predetermined character string indicative of forwarding is included in a title of the second e-mail, the controller is configured to determine that the second e-mail was generated by using the first e-mail, and in a case where the predetermined character strings are not included in the title of the second e-mail, the controller is configured to determine that the second e-mail was not generated by using the first e-mail.

12. The server as in claim 9, wherein
in a case where a file name of the first image file matches a file name of the second image file, the controller is configured to determine that the second e-mail was generated by using the first e-mail, and in a case where the file name of the first image file does not match the file name of the second image file, the controller is configured to determine that the second e-mail was not generated by using the first e-mail.

13. The server as in claim 9, wherein
each of the one or more e-mail addresses stored in the memory includes a predetermined domain, the first e-mail further includes a specific e-mail address as a recipient e-mail address, wherein the specific e-mail address includes the predetermined domain and is not stored in the memory, the controller is further configured to:
  in a case where the first e-mail is received from the first external device, specify the first print address that includes the predetermined domain and is stored in the memory from among the first print address, the first general address, and the specific e-mail address, and the first printer is a printer identified by the first printer identification information stored in the memory in association with the specified first print address.

14. The server as in claim 9, wherein
the memory is further configured to store, for each of the one or more e-mail addresses, the e-mail address, the printer identification information, and a priority in association with each other, the first e-mail further includes a second print address that is an e-mail address stored in the memory and is different from the first print address, a first priority stored in the memory in association with the first print address is higher than a second priority stored in the memory in association with the second print address, the controller is configured to send the first print request only to the first printer corresponding to a higher priority between the first printer and a second printer, and the second printer is a printer identified by second printer identification information stored in the memory in association with the second print address included in the first e-mail.

15. The server as in claim 9, wherein
in the case where the sender e-mail address is the notification address, the fourth e-mail is not sent.

* * * * *